Figure 1:
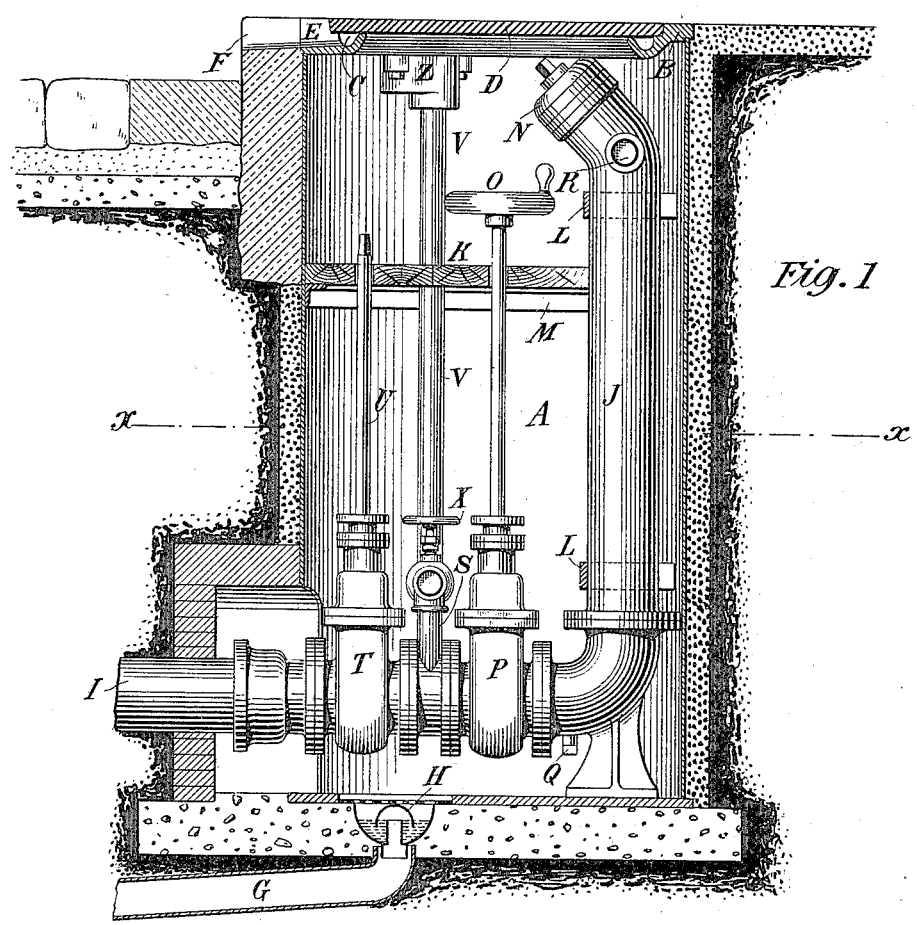

No. 617,086. Patented Jan. 3, 1899.
P. ELEY.
FIRE AND STREET SERVICE HYDRANT.
(Application filed Nov. 14, 1896.)
(No Model.)

Witnesses:
Raphaël Netter
Edwin B. Hopkinson.

Philip Eley, Inventor
by Kerr Curtis Page Attys.

UNITED STATES PATENT OFFICE.

PHILIP ELEY, OF BAYONNE, NEW JERSEY.

FIRE AND STREET SERVICE HYDRANT.

SPECIFICATION forming part of Letters Patent No. 617,086, dated January 3, 1899.

Application filed November 14, 1896. Serial No. 612,047. (No model.)

*To all whom it may concern:*

Be it known that I, PHILIP ELEY, a citizen of the United States, residing at Bayonne, in the county of Hudson and State of New Jersey, have invented certain new and useful Improvements in Fire and Street Service Hydrants, of which the following is a specification, reference being had to the drawings accompanying and forming a part of the same.

The invention subject of my present application is an improvement in fire-department and street service water apparatus devised with reference to the needs of municipal water-service and designed to obviate certain objections to the hydrants and such devices of this kind as have heretofore been in general use.

The nature of my improvements and the special purposes for which the same are intended will be understood from the following statement of the practical conditions now met with.

In all municipal systems of water-distribution the provision which is almost universally made for the delivery of water for extinguishing fires, sprinkling streets, and flushing the sewers is by means of hydrants connected to the mains and provided with a single controlling valve or gate and one or more nozzles, to which connection is made for any or all of the purposes mentioned. The result of this has proved a serious drawback to the efficiency of the fire-departments by reason of the fact that the hydrant-valves are in frequent use and subject to considerable wear, while the apparatus in the hands of careless or unskilled persons is being constantly injured or left in improper condition. So serious has this become that the reports of superintendents and fire-department chiefs in the large cities go to show that their departments are heavily handicapped by the damage done to the hydrants or by their freezing up on account of water being allowed to remain therein by careless or irresponsible persons who use them.

The main purpose of my invention is to provide an apparatus combining a hydrant or discharge-pipe for the use of the fire-department and one or more discharge-pipes for street service, entirely independent of the former, but all arranged in compact form and so as to be readily accessible to those authorized to use them, and contained in an underground chamber the top of which is flush with the sidewalk or pavement, so as not to form obstructions in the street.

I have illustrated my improvements, in the form in which, so far as I am now aware, they may best be carried out, in the drawings hereto annexed.

Figure 2:
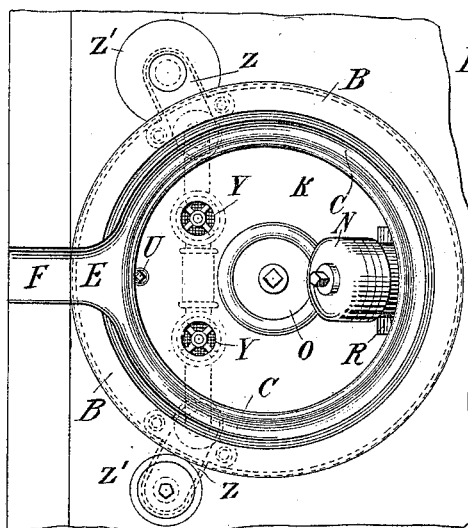
Figure 3:
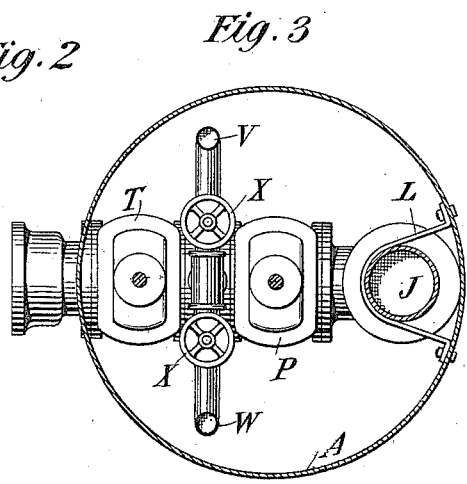

Figure 1 is a vertical section of my improved apparatus, showing the manner in which the same is designed for use. Fig. 2 is a top plan view of the same, and Fig. 3 a cross-section on line *x x* in Fig. 1.

A represents a box or chamber which is preferably a steel cylinder of about six feet in depth, which is intended to be sunk in the earth below the sidewalk immediately inside of the curb. The top of the cylinder or chamber is provided with an annular plate B, containing a circular groove C, which serves as a gutter to collect such surface water as may find its way under the lid D. From this gutter C runs a groove E to the curbstone, in which latter a notch F is cut, which affords a channel through which the water collected in the gutter C may find its way to the street-gutter, and also affords a ready means for raising the lid D by the insertion under the same of a bar or tool of proper character.

From the bottom of the chamber A a pipe G, containing a trap H, runs to the street-sewer and carries off the drip from the service-pipes or any water that may find its way into the said chamber. It will of course be understood that any other suitable provision for disposing of the drip or water which may accumulate in the chamber A may be provided in place of the sewer connection described.

A branch I from the street water-main enters the chamber A near the bottom thereof, and to said branch, by means of proper couplings, there is connected a pipe J, which extends up through the chamber nearly to the lid or cover D. This pipe should be of comparatively large diameter and should be firmly supported within the chamber A, as by means of straps L L, which secure it to the wall of said chamber. Its position within the chamber should be that farthest removed from the curb-line, and its upper end should be bent obliquely toward the curb-line, as shown, and provided with a nozzle and cap, if so desired, so that by the removal of the latter the suction-pipe for a steam fire-engine may be readily attached to it. To facilitate the attachment of the suction-pipe and for the better protection of the devices contained in the chamber, a platform K is supported on an angle-iron M within the chamber, as indicated. A fireman in using the device removes the cover or lid D, steps down upon the platform K, removes the cap N, attaches the suction-pipe to the nozzle of pipe J, and turns on the water by a hand-wheel O, controlling a gate-valve P.

The character of the water-pipe J avoids any sharp angles or bends which impede the flow of water and affords a very perfect and effective discharge.

At the lowest point of the pipe J is a drip-valve Q of the ordinary construction, which opens under reduced pressure and permits the water in the pipe J to run off after the gate P has been closed. If more than one nozzle for the pipe J is required, branch pipes may be connected thereto, as shown at R.

In order that water may be obtained from the branch I for street-sprinkling purposes, the flushing of sewers, or the like without interfering in any way with the fire service or hydrant proper, I connect with said branch I, between the main and the gate-valve P, a pipe S, and between the main and the latter I insert an additional gate-valve T, which is normally open, but which is provided with a stem U, extending up through the platform K, and which may be turned by a key to close the gate-valve T when occasion requires—as, for instance, to repair the hydrant or water-pipe J.

It is preferable to provide two discharge-outlets for street service, one for the street-sprinklers and the other for occasional uses, such as flushing gutters or sewers. I therefore continue the pipe S upward in two branches V and W, which run up the sides of the chamber A nearly to the top of the same. These branches are controlled by valves X, placed as near the bottom of the chamber A as practicable and operated by a forked rod introduced through small openings Y in the platform K. The upper ends of the branches V W connect with cast-iron water-boxes Z, which extend outward at right angles to the branches V W to boxes Z' outside of the cylinder or case A and covered by ordinary lids such as are usually employed for such purposes. The boxes Z' contain threaded nozzles of ordinary character to which a hose may be attached or an upright or crane for supplying water to street-sprinkling carts. It is preferable that one of the boxes and nozzles should be designed for the attachment thereto of such a crane and used only for this purpose, while the other box may be for drawing water from the mains for any purpose that may be desired.

It will now be seen that by this arrangement the pipe J is reserved for the sole use of the fire-department and that any injury which may result from the careless or improper use of the means for supplying water for other municipal purposes will be confined to the latter devices alone and will not impair the efficiency of the fire-department service. The construction of the chamber and arrangement of the apparatus therein is simple and compact, and while it affords ready access to all parts of the apparatus it in no way encumbers the streets or sidewalks and affords perfect protection for the apparatus.

Having now described my invention, what I claim is—

1. A municipal fire and street service apparatus comprising in combination, an underground chamber with its lid or cover flush with the pavement, a platform therein upon which a fireman may stand in connecting a fire-hose, a branch from a water-main extending up through the chamber and terminating below the cover of the chamber in a nozzle for the attachment of a fire-hose or the suction-pipe of a fire-engine, a valve or gate in said branch controllable from the upper portion of the chamber, one or more street-service pipes connected with the branch between the valve and the main and independent valves therefor, as set forth.

2. A municipal fire and street service apparatus for waterworks comprising an underground chamber with its top or lid flush with the pavement, a branch from a water-main extending up through the same and provided with a nozzle for fire-hose or the suction-pipe of a fire-engine, a valve or gate in said branch, one or more street-service pipes connected with the branch between the valve and the main and extending up through the chamber to smaller independent boxes or chambers flush with the pavement, and valves in each of said pipes whereby water may be drawn from them without interfering with or disturbing the main valve, as set forth.

3. The combination with the underground box or chamber A, and the lid D flush with the pavement, the branch pipe I ending in a vertical pipe J with a nozzle turned obliquely to facilitate the attachment thereto of a fire-hose and terminating below the lid of the chamber, the platform K within the chamber, the gate-valve P at the bottom of the chamber, and the valve-stem with operating handle or wheel O, as set forth.

4. The combination with the underground box or chamber A and the lid D flush with the pavement, the branch pipe I, the vertical fire-service pipe J, the gate-valve P, the street-service pipe S between the valve P and the main, and the gate-valve T between the branch S and the main.

5. The combination with an underground chamber A having its lid flush with the pavement, of one or more side boxes Z' Z', a branch pipe from a water-main extending up through the chamber A and constituting a fire-service pipe, one or more street-service pipes V, W, extending from the branch pipe up through the chamber A and out into the side boxes, respectively, a gate-valve P for controlling the discharge of water through the fire-service pipe, and located beyond the street-service pipes, and controlling-valves in the street-service pipes, as set forth.

PHILIP ELEY.

Witnesses:
M. LAMSON DYER,
DRURY W. COOPER.